United States Patent [19]
Pyle et al.

[11] 3,756,622
[45] Sept. 4, 1973

[54] RETRACTABLE VEHICLE STEP

[76] Inventors: Archie C. Pyle, 405 W. 10th North, Logan, Utah 84321; Allen H. Richman, 108 E. 2nd South, Millville, Utah 84326

[22] Filed: Dec. 3, 1971

[21] Appl. No.: 204,544

[52] U.S. Cl. .............................................. 280/166
[51] Int. Cl. ............................................. B60r 3/02
[58] Field of Search ....................... 280/166; 182/88

[56] References Cited
UNITED STATES PATENTS

| | | | |
|---|---|---|---|
| 3,515,406 | 7/1970 | Endsley | 280/166 |
| 2,956,638 | 10/1960 | Bustin | 182/88 |
| 3,008,533 | 11/1961 | Haberle | 182/88 |
| 2,809,849 | 10/1957 | Benne | 182/88 |
| 3,507,515 | 4/1970 | Brammer | 280/166 |
| 2,533,050 | 12/1950 | Runyan | 182/88 |
| 1,363,396 | 12/1920 | Cross | 280/166 |

Primary Examiner—Benjamin Hersh
Assistant Examiner—Robert R. Song
Attorney—Lynn G. Foster

[57] ABSTRACT

A retractable vehicle step comprising a pair of channel members mounted in facing spaced relation on the frame of said vehicle and each formed with a downwardly inclined lower end portion located adjacent the edge of said frame, a generally rectangular slide carried by said channel members and slidable between an extended position and a retracted position, and at least one generally rectangular step pivotally secured to said slide and rotatable between a nesting position lying substantially in the plane of said slide and a second position substantially horizontally from said slide when said slide is in said extended position.

2 Claims, 5 Drawing Figures

RETRACTABLE VEHICLE STEP

BACKGROUND

1. Field of Invention

This invention relates to vehicles and is particularly directed to step means which are extendable to facilitate boarding and departing from the vehicle and which are retractable for storage while the vehicle is in motion.

In the construction of vehicles, such as cars, trucks, airplanes, campers and trailers, it is necessary that the frame, supporting the floor or bed, be mounted high enough from the ground to prevent interference with the ground during movement of the vehicle. However, this height often makes it inconvenient or difficult for people to board or alight from the vehicle.

1. Prior Art

In the past, numerous attempts have been made to overcome this problem. However, none of the prior art techniques have been entirely satisfactory. Rigid steps and ladders have been provided mounted externally on the side or depending below the frame. Unfortunately, the side mounted ladders and steps do little or nothing to alleviate the problem, while those depending below the frame reduce the ground clearance of the vehicle and are frequently damaged or knocked off during operation of the vehicle. Moreover, with aircraft, the provision of rigid external steps creates drag which hampers the performance of the aircraft. It has also been proposed to provide steps formed internally of the vehicle having a door in the side of the vehicle to provide access to the steps. However, this decreases the useful space within the vehicle. It has also been proposed to provide a stool which was physically independent of the vehicle but which could be stored on board during movement and placed adjacent the vehicle to facilitate boarding and alighting from the vehicle. Unfortunately, such stools tend to provide uncertain footing unless placed on a flat surface, frequently become lost or stolen, and occupy useful space within the vehicle during movement. Other vehicles have employed doors which were hinged at the bottom and were movable between a vertical closed position and a lowered, outwardly inclined position for use as a ramp or stairway. However, such doors must be constructed much more ruggedly than conventional doors which decreases the useful load of the vehicle and the hinges of such doors often become bent sufficiently to interfere with or prevent closure of the doors. In addition, power acutated steps have been employed which are mechanically extended and retracted. However, these devices are often complex, expensive, and complicated to install and maintain.

BRIEF SUMMARY AND OBJECTS OF INVENTION

These disadvantages of the prior art are overcome with the present invention and a novel step device is provided which is inexpensive, compact and light weight, and requires minimal area for storage, yet is quickly and easily actuated, is reliable and maintenance-free, and can be installed quickly and easily without substantial modification of the vehicle.

The advantages of the present invention are preferably attained by mounting a pair of channel members on the frame of the vehicle in spaced facing relation, each of said channel members having a downwardly inclined lower end portion located adjacent the edge of the frame, a generally rectangular slide carried by said channel members and slidable between an extended position and a retracted position, and at least one generally rectangular step pivotally secured to said slide and rotatable between a nesting position lying substantially in the plane of said slide and a second position projecting substantially horizontally from said slide when said slide is in said extended position.

Accordingly, it is an object of the present invention to provide improved step means for vehicles.

Another object of the present invention is to provide improved retractable step means for vehicles.

A further object of the present invention is to provide retractable step means for vehicles which require minimal storage area.

An additional object of the present invention is to provide retractable step means for vehicles which can be installed quickly and easily without substantial modification of the vehicle.

A specific object of the present invention is to provide retractable step means for vehicles comprising a pair of channel members mounted in facing spaced relation on the frame of the vehicle, each having a downwardly inclined lower end portion located adjacent the edge of the frame, a generally rectangular slide carried by said channel members and slidable between an extended position and a retracted position, and at least one generally rectangular step pivotally secured to said s'ide and rotatable between a nesting position lying substantially in the plane of said slide and a second position projecting substantially horizontally from said slide when said slide is in said extended position.

These and other objects and features of the present invention will be apparent from the following detailed description taken with reference to the accompanying drawings.

DETAILED DESCRIPTION OF THE ILLUSTRATED EMBODIMENT

Figure 1:
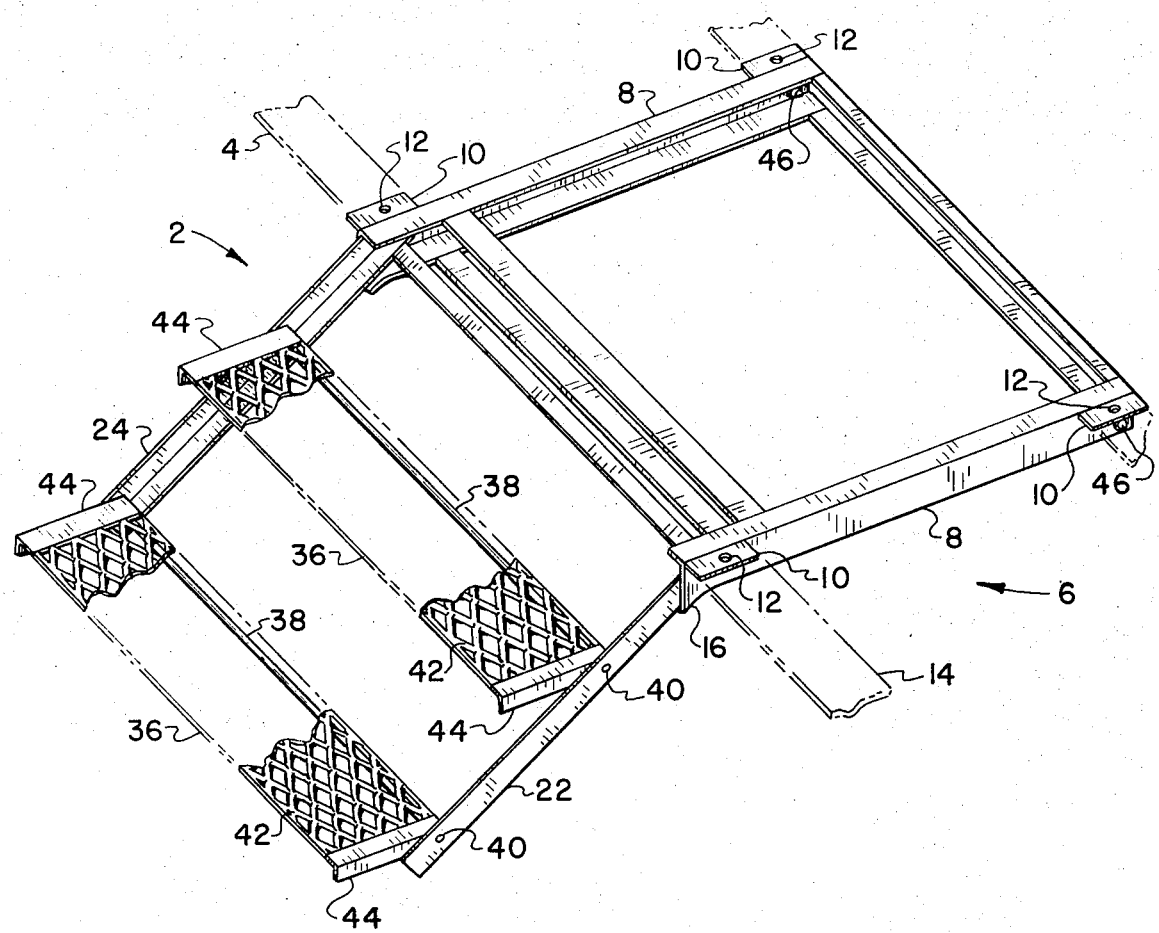
FIG. 1 is an isometric view of a retractable step means embodying the present invention mounted on a vehicle, a portion of which is shown in phantom, with the slide in the extended position.
Figure 5:
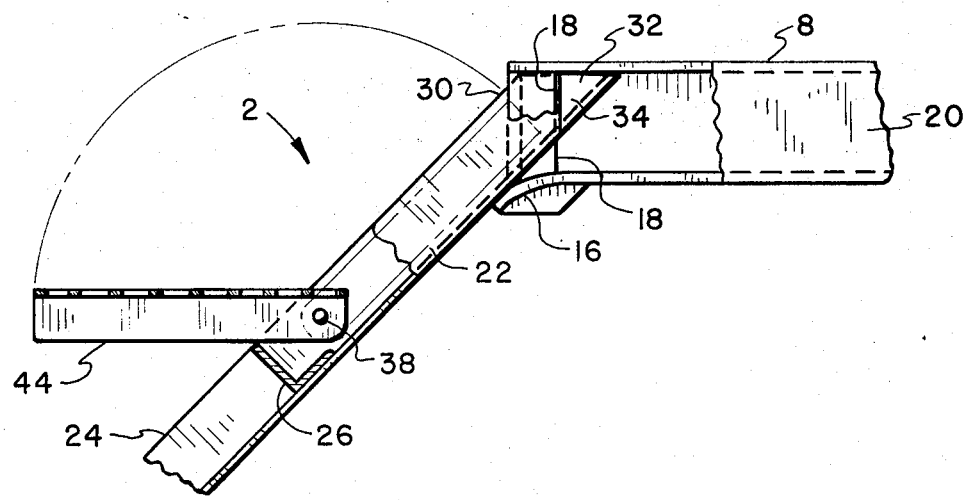
FIG. 5 is an enlarged fragmentary view showing the junction between the slide and the channel members when the slide is in the extended position.

In that form of the present invention chosen for purposes of illustration, FIG. 1 shows a retractable step means, indicated generally at 2, secured to the frame 4 of a vehicle 6, shown in phantom. As shown, the step means 2 comprises a pair of generally U-shaped channel members 8 having flanges 10 formed with apertures 12 for receiving screws, bolts, or the like, to secure the channel members 8 to the frame 4 of the vehicle 6. Alternatively, if desired, the channel members 8 may be secured to the floor, bed, or other appropriate portion of the vehicle 6. The channel members 8 are mounted extending substantially perpendicular to an edge 14 of the frame 4 and are formed with downwardly inclined lower end portions 16 located adjacent the edge 14 of the frame 4, while vertically extending stop means 18 are provided on the inside of the vertical sides 20 of channel members 8 adjacent end portions 16.

Figure 2:
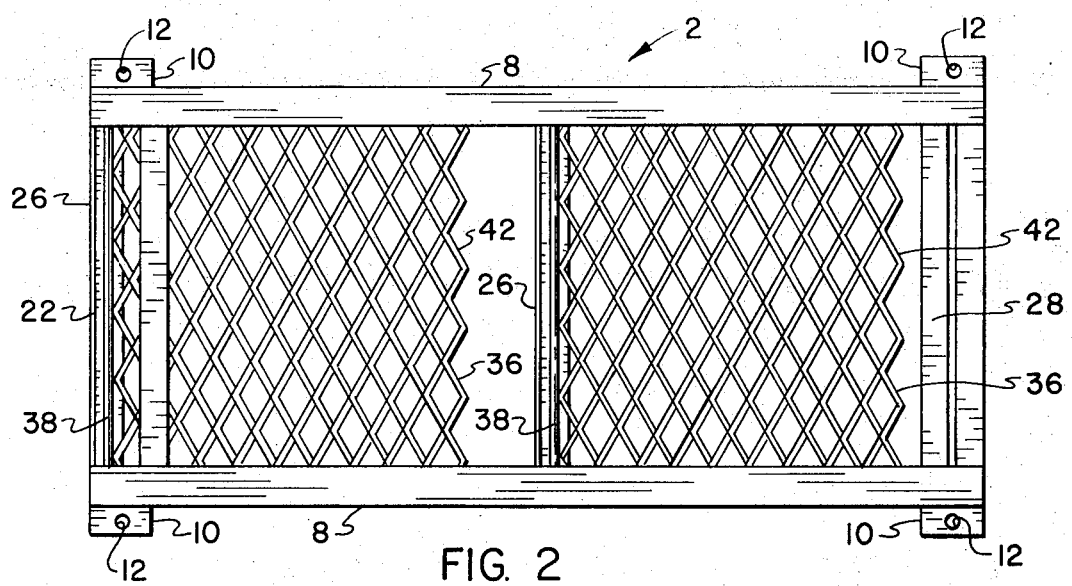
FIG. 2 is a plan view of the step means of FIG. 1 with the slide in the retracted position.
Figure 3:
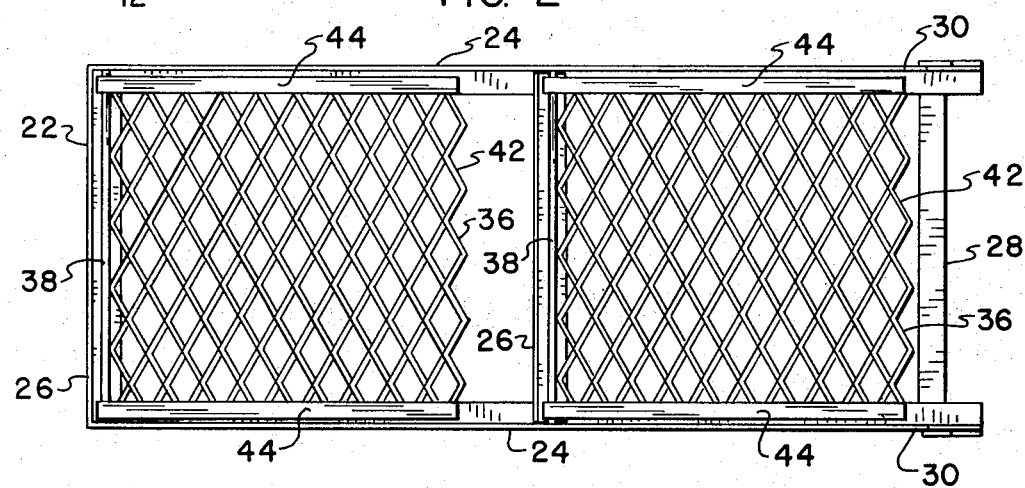
FIG. 3 is a plan view of the slide of the step means of FIG. 1.
Figure 4:
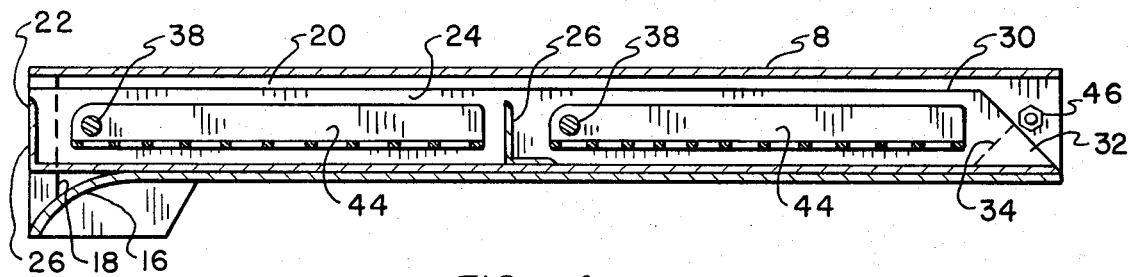
FIG. 4 is a longitudinal section taken on the line 4—4 of FIG. 2.

As best seen in FIGS. 1–3, a generally rectangular slide 22 is slidably mounted within the channel members 8 and comprises a pair of spaced, parallel, L-shaped, side members 24 joined at one end and at their midpoints by L-shaped cross members 26. A flat cross member 28 joins the horizontal portions of the opposite ends 30 of side members 24 while the vertical portions of side members 24 are tapered adjacent end portions 30, as indicated at 32, and generally triangular stop means 34 are provided on the outside of the vertical portions of side members 24 adjacent the tapered end portions 30. A pair of generally rectangular steps 36 are pivotally secured to the slide 22, as by rods 38 which are rotatably received within apertures 40 formed in the side members 24. As shown, the steps 36 are formed of metal mesh 42 which is secured, by wleding or the like, to generally L-shaped frame members 44 and to the rods 38. When the slide 22 has been slid into assembled relation with the channel members 8, bolts 46 are secured to the vertical sides 20 of the channel members 8, as through suitable apertures to secure the step means 2 in assembled relation.

In use, the step means 2 may be stored by pivoting the steps 36 to lie against the horizontal portions of side members 24 substantially within the plane of the slide 22, as seen in FIG. 2. The slide 22 is then moved rearwardly along channel members 8 until stop means 34 engage bolts 46. In this condition, the step means 2 is retracted inboard of edge 14 of the frame 4 of vehicle 6 and closely underlies the frame 4, wholly between the channel members 8, as seen in FIG. 2, so as to provide maximum ground clearance and minimal aerodynamic drag. To extend the step means 2 to facilitate boarding or alighting from the vehicle 6, the slide 22 is drawn forwardly along and substantially in alignment with channel members 8 until stop means 34 of the slide 22 engage stop means 18 of the channel members 8. Thereafter, the slide 22 is lowered until the horizontal portions of the side members 24 engage the downwardly inclined end portions 16 of the channel members 8 and the tapered portions 30 of side members 24 engage the upper horizontal portions of channel members 8 with the slide 22 projecting outwardly and downwardly from channel members 8, as seen in FIG. 1. Next, the steps 36 are pivoted to rest upon the upstanding portions of the cross members 26 so that the steps 36 project substantially horizontally from the slide 22, as seen in FIG. 1.

Where the step means 2 is to be employed on an airplane or the like, the step means could, obviously, be mounted internally of the skin of the aircraft to eliminate drag and an access hatch could be provided to permit extension and retraction of the step means 2. Moreover, it will be apparent that, if desired, automatic means, such as a hydraulic cylinder could be provided to actuate the step means 2.

In addition, numerous other variations and modifications may obviously be made without departing from the present invention. Accordingly, it should be clearly understood that the form of the present invention described above and shown in the accompanying drawings is illustrative only and is not intended to limit the scope of the invention.

What is claimed is:
1. A retractable step assembly comprising:
   a pair of channel members mounted on said vehicle in facing spaced relation with each of said channel members having a downwardly inclined lower end portion located adjacent an edge of said vehicle,
   slide means carried by said channel members and slidable between an extended position and a retracted position,
   at least one step pivotally secured to said slide means and rotatable between a nesting position lying substantially in the plane of said slide means and a second position projecting substantially horizontally from said slide means when said slide means is in said extended position, said slide means comprising a pair of generally L-shaped side members each slidably received within a respective one of said channel members and formed with the vertical portions thereof being tapered adjacent one end thereof, and a pair of generally L-shaped cross members connecting said side members adjacent the midpoints of said side members and adjacent the end of said side members opposite said tapered positions,
   first stop means provided on the inside of the vertical portion of at least one of said channel members, and
   second stop means, generally triangular in configuration, provided on the outside of said slide means adjacent said tapered portion and engagable with said first stop menas to limit the travel of said slide means.

2. A retractable vehicle step assembly comprising: a fixed frame comprising:
   means for mounting the fixed frame to and under a vehicle;
   opposed side channel members arranged so that top and bottom flanges of each extend generally horizontal toward each other with the web of each extending generally vertically, the bottom flange of each tapering downwardly at one end to form an angle with the horizontal;
   cross members extending between and firmly anchored to the side channel members thereby forming a rigid frame with the channel members;
   first stop means secured to the interior of the web of each channel member adjacent the tapered bottom flange;
   second stop menas secured to the interior of the web of each channel member adjacent the end remote from the tapered bottom flange, the distance between said second stop means being substantially the same as the distance between said first stop means; a rigid slidable frame comprising:
   side members spaced one from the other a distance fractionally less than the distance between said first stop means and having a vertical dimension substantially less than the distance between the flanges of the channel members;
   cross members anchored to and spanning between the side members;
   said side members being respectively slidably disposed between the flanges of the channel members, each side member having a third stop means at the exterior of one end thereof whereby sliding displacement of the slidable frame is confined between the first and second stop means;

each said side member having a diagonal end adjacent the third stop means whereby when the slidable frame is displaced until the first and third stop means are juxtaposed, the diagonal end of each side member will engage the top flange of the adjacent channel member and the bottom of each side member will engage the tapered flange portion of the adjacent channel member placing the slidable frame in cantilevered disposition at an acute angle to the vertical and the horizontal;

at least one step pivotally mounted to the side members and displaceable between a folded position within the plane of the slidable frame accommodating placement of the slidable frame entirely within the fixed frame and an unfolded generally horizontal position when the slidable frame is retracted from the fixed frame in said angular cantilevered position;

stop means carried by the slidable frame against which the step abuts in the unfolded position.

* * * * *